(12) United States Patent
Inoue et al.

(10) Patent No.: US 10,683,824 B2
(45) Date of Patent: Jun. 16, 2020

(54) ENGINE CONTROL SYSTEM, VEHICLE SYSTEM, AND ENGINE CONTROL METHOD

(71) Applicant: MITSUBISHI HEAVY INDUSTRIES, LTD., Tokyo (JP)

(72) Inventors: Kanta Inoue, Tokyo (JP); Yukio Yamashita, Tokyo (JP); Mitsufumi Goto, Tokyo (JP); Musashi Sakamoto, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 47 days.

(21) Appl. No.: 15/516,592

(22) PCT Filed: Feb. 6, 2015

(86) PCT No.: PCT/JP2015/053356
§ 371 (c)(1),
(2) Date: Apr. 3, 2017

(87) PCT Pub. No.: WO2016/056255
PCT Pub. Date: Apr. 14, 2016

(65) Prior Publication Data
US 2018/0202381 A1  Jul. 19, 2018

(30) Foreign Application Priority Data
Oct. 7, 2014  (JP) .................................. 2014-206298

(51) Int. Cl.
*F02D 41/24* (2006.01)
*F02D 41/26* (2006.01)
(Continued)

(52) U.S. Cl.
CPC .......... *F02D 41/2487* (2013.01); *B60R 16/02* (2013.01); *F02D 41/0007* (2013.01);
(Continued)

(58) Field of Classification Search
CPC ... B60R 16/02; F02D 41/266; F02D 41/0007; F02D 41/0052; F02D 41/2487; F02D 2250/12; F02D 41/0047
See application file for complete search history.

(56) References Cited

U.S. PATENT DOCUMENTS 4,791,569 A  12/1988 Suzuki
5,775,296 A  7/1998 Göras et al.
(Continued)

FOREIGN PATENT DOCUMENTS

CN  101064653 A  10/2007
CN  203293918 U  11/2013
(Continued)

OTHER PUBLICATIONS

International Search Report dated May 19, 2015 in PCT/JP2015/053356 with an English Translation.
(Continued)

*Primary Examiner* — Sizo B Vilakazi
(74) *Attorney, Agent, or Firm* — Birch, Stewart, Kolasch & Birch, LLP

(57) ABSTRACT

Each of a plurality of control devices (10, 11, 12) of an engine control system (1) is provided with a drive control unit (100, 110, 120) which controls the drive of an engine unit to be controlled according to memory information stored in a memory of the control device, a memory information output unit which outputs the memory information stored in the memory of the control device to other control devices, and a memory information update unit which writes memory information received from the memory information output units of other control devices into the memory of the control device.

10 Claims, 6 Drawing Sheets

(51) Int. Cl.
*F02D 41/00* (2006.01)
*B60R 16/02* (2006.01)

(52) U.S. Cl.
CPC ....... *F02D 41/0052* (2013.01); *F02D 41/266* (2013.01); *F02D 41/0047* (2013.01); *F02D 2250/12* (2013.01); *Y02T 10/144* (2013.01)

(56) References Cited

U.S. PATENT DOCUMENTS

| | | |
|---|---|---|
| 2002/0072845 A1 | 6/2002 | Eichenseher et al. |
| 2002/0105676 A1 | 8/2002 | Fujiwara et al. |
| 2003/0033067 A1* | 2/2003 | Arita .................. B60R 16/0315 701/48 |
| 2006/0074542 A1 | 4/2006 | Kikutani |
| 2007/0133578 A1 | 6/2007 | Tani |
| 2008/0147248 A1* | 6/2008 | Kawamura ............ G01C 21/26 701/1 |
| 2009/0088892 A1 | 4/2009 | Shimizu et al. |
| 2009/0299566 A1* | 12/2009 | Tanigawa ............... G07C 5/008 701/31.4 |

FOREIGN PATENT DOCUMENTS

| | | |
|---|---|---|
| CN | 103488565 A | 1/2014 |
| EP | 1136325 A2 | 9/2001 |
| JP | 5-274166 A | 10/1993 |
| JP | 2002-334023 A | 11/2002 |
| JP | 2004-310221 A | 11/2004 |
| JP | 2007-166302 A | 6/2007 |
| JP | 2007-300331 A | 11/2007 |
| JP | 2009-286295 A | 12/2009 |
| JP | 2014-154024 A | 8/2014 |
| WO | WO 2010/130872 A1 | 11/2010 |

OTHER PUBLICATIONS

Written Opinion dated May 19, 2015 in PCT/JP2015/053356 with an English Translation.

* cited by examiner

ENGINE CONTROL SYSTEM, VEHICLE SYSTEM, AND ENGINE CONTROL METHOD

TECHNICAL FIELD

The present invention relates to an engine control system, a vehicle system, and an engine control method.

This application claims the benefit of priority based on Japanese Patent Application No. 2014-206298, filed Oct. 7, 2014, the content of which is incorporated herein by reference.

BACKGROUND ART

In recent years, there is a case where, in order to control devices, such as an engine, a turbocharger, and an exhaust gas recirculation (EGR), an engine control system divided into an engine control unit (ECU) configured to control an engine body part and an ECU configured to control the turbocharger, the EGR, or the like is mounted.

Since the ECUs which control the above-described devices constituting the engine need to control the engine body part, the turbocharger, the EGR, and the like in cooperation with one another, the amount of communication between the ECUs increases, and calculation loads of the ECUs tend to increase.

If communication delay occurs in a network of the ECUs, it is supposed that control of the engine becomes unstable. For this reason, a communication network which includes a network relay device or a database distribution node so as to prevent the occurrence of communication delay has been suggested (for example, see PTL 1 and PTL 2).

CITATION LIST

Patent Literature

[PTL 1] Japanese Unexamined Patent Application Publication No. 2007-166302
[PTL 2] Japanese Unexamined Patent Application Publication No. 2007-300331

SUMMARY OF INVENTION

Technical Problem

However, if the communication network is about to be constructed so as to prevent the occurrence of communication delay between the ECUs, the form of the communication network becomes complicated, and labor and cost required for designing the communication network increase.

An object of the invention is to provide an engine control system, a vehicle system, and an engine control method capable of reducing a calculation load of each ECU while suppressing communication delay between ECUs.

Solution to Problem

According to a first aspect of the invention, an engine control system includes a plurality of control devices which respectively have a plurality of engine units constituting an engine as a target to be controlled. Each of the plurality of control devices includes a drive control unit which controls the drive of the engine unit to be controlled according to memory information stored in a memory of the control device, a memory information output unit which outputs memory information stored in the memory of the control device to other control devices, and a memory information update unit which writes memory information received from the memory information output units of other control devices into the memory of the control device.

According to a second aspect of the invention, the memory information output unit outputs the memory information to one specific control device specified in advance, and the memory information update unit receives the memory information from the memory information output unit of the one specific control device specified in advance.

According to a third aspect of the invention, the drive control unit refers to a storage area which is a storage area divided in advance in a storage area of the memory and into which information relating to the drive of the engine unit to be controlled is written.

According to a fourth aspect of the invention, the drive control unit further refers to a storage area which is a storage area divided in advance in the storage area of the memory and into which information relating to the drive of the engine unit not to be controlled is written.

According to a fifth aspect of the invention, a vehicle system includes the above-described engine control system, and an in-vehicle system which is mounted in a vehicle. The engine control system and the in-vehicle system are connected through a communication network independent from a communication network which connects the memory information output units and the memory information update units of the plurality of control devices.

According to a sixth aspect of the invention, there is provided an engine control method which controls an engine using a plurality of control devices respectively having a plurality of engine units constituting the engine as a target to be controlled. The engine control method includes a step of controlling the drive of the engine unit to be controlled according to memory information stored in a memory of each of the plurality of control devices, a step of enabling a memory information output unit to output memory information stored in the memory of the control device to other control devices, and a step of writing memory information received from the memory information output units of other control devices into the memory of the control device.

Advantageous Effects of Invention

According to the storage area, the vehicle system, and the engine control method described above, it is possible to reduce a calculation load of each ECU while suppressing communication delay between ECUs.

DESCRIPTION OF EMBODIMENTS

First Embodiment

Hereinafter, an engine control system according to a first embodiment will be described in detail referring to FIGS. 1 to 4.

Figure 1:
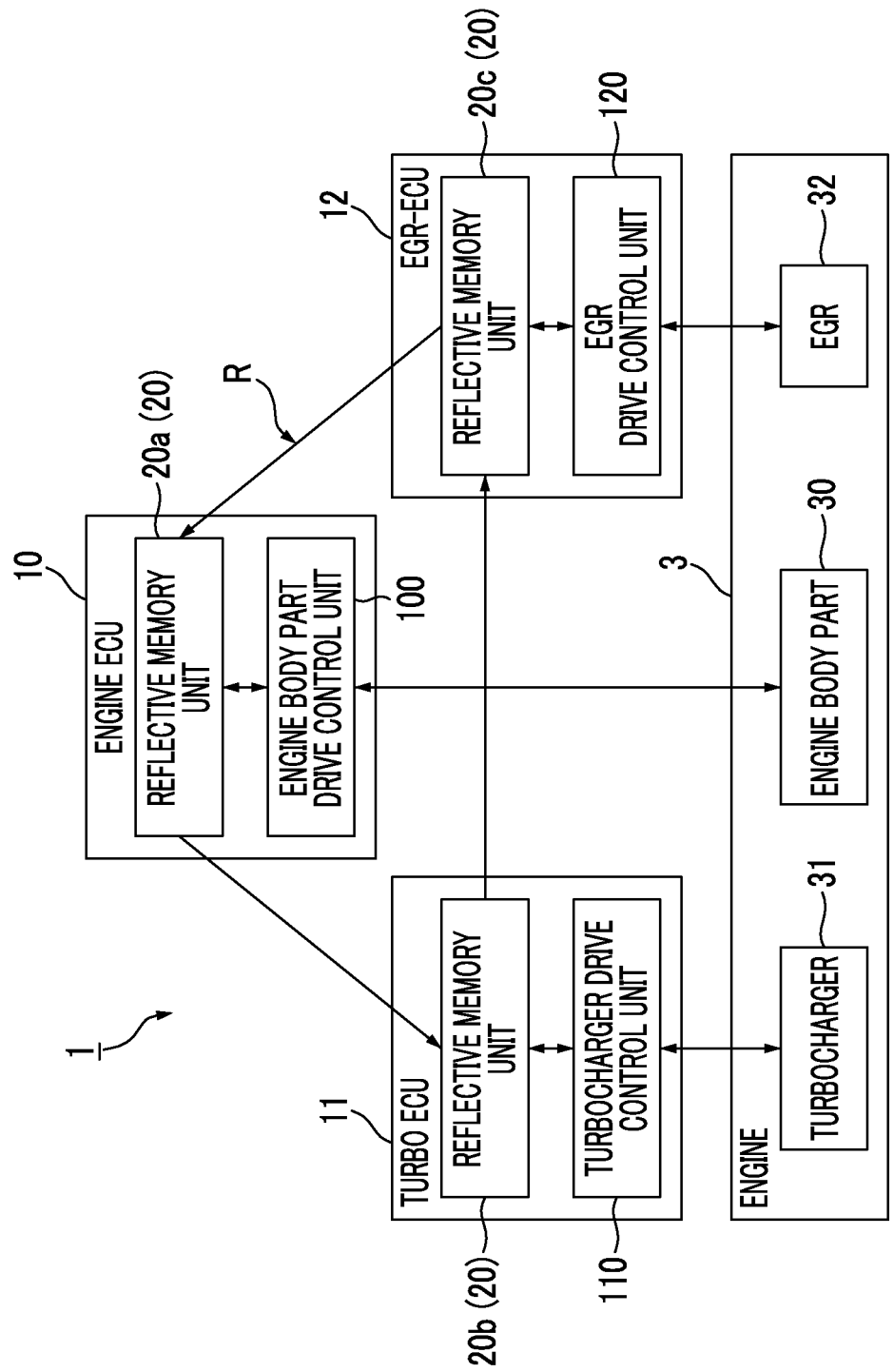
FIG. 1 is a diagram showing the functional configuration of an engine control system according to a first embodiment.

FIG. 1 is a diagram showing the functional configuration of the engine control system according to the first embodiment.

As shown in FIG. 1, an engine control system 1 includes a plurality of control devices (engine ECU 10, turbo ECU 11, and EGR-ECU 12) which respectively have a plurality of engine units (engine body part 30, turbocharger 31, and EGR 32) constituting an engine 3 as a target to be controlled.

The engine ECU 10 is a control device which controls the drive of an engine body part 30 in the engine 3. The engine ECU 10 performs control such that the operation state of the entire engine 3 is optimized in cooperation with the turbo ECU 11 and the EGR-ECU 12 according to an input command based on a driver's operation (depression of an accelerator pedal, or the like). The cooperative operation of the turbo ECU 11 and the EGR-ECU 12 will be described below.

The turbo ECU 11 is a control device which controls the drive of a turbocharger 31 among the engine units constituting the engine 3.

The EGR-ECU 12 is a control device which controls the drive of the EGR 32 among the engine units constituting the engine 3.

The engine ECU 10 includes an engine body part drive control unit 100 (drive control unit). The engine body part drive control unit 100 controls the drive of the engine body part 30 as an engine unit to be controlled according to memory information stored in a memory 200 (see FIG. 2) of a reflective memory unit 20a in the engine ECU 10.

The turbo ECU 11 includes a turbocharger drive control unit 110 (drive control unit). The turbocharger drive control unit 110 controls the drive of the turbocharger 31 as an engine unit to be controlled according to memory information stored in a memory 200 (see FIG. 2) of a reflective memory unit 20b in the turbo ECU 11.

Similarly, the EGR-ECU 12 includes an EGR drive control unit 120 (drive control unit). The EGR drive control unit 120 controls the drive of the EGR 32 as an engine unit to be controlled according to memory information stored in a memory 200 (see FIG. 2) of a reflective memory unit 20c in the EGR-ECU 12.

The reflective memory unit 20 (20a, 20b, 20c) provided in each of a plurality of control devices (engine ECU 10, turbo ECU 11, and EGR-ECU 12) is a unit which manages memory information required when the control device (each of the drive control units) controls the drive of each engine unit constituting the engine 3.

As shown in FIG. 1, a plurality of reflective memory units 20 (20a, 20b, 20c) are connected to one another by a communication network R which is a ring network. Each reflective memory unit 20 is configured such that memory information stored therein flows in one direction through the communication network R wired in a ring shape.

Specifically, the reflective memory unit 20a in the engine ECU 10 outputs memory information stored therein toward the reflective memory unit 20b in the turbo ECU 11. The reflective memory unit 20b in the turbo ECU 11 outputs memory information stored therein toward the reflective memory unit 20c in the EGR-ECU 12. Similarly, the reflective memory unit 20c in the EGR-ECU 12 outputs memory information stored therein toward the reflective memory unit 20a in the engine ECU 10.

In this embodiment, the communication network R is constituted of an optical fiber as a communication wiring. With this, it is possible to achieve reduction in weight of the entire engine control system 1, and to improve communication speed and reliability of communication.

The reflective memory units 20 are not limited to the above-described aspect in other embodiments, and may be connected by a communication network other than a ring shape or may be connected by a communication wiring (general metal wiring) other than an optical fiber.

A plurality of reflective memory units 20 output and update the memory information by way of the communication network R such that the respective pieces of memory information stored therein become identical. Hereinafter, the function of the reflective memory unit 20 will be described in detail.

Figure 2:
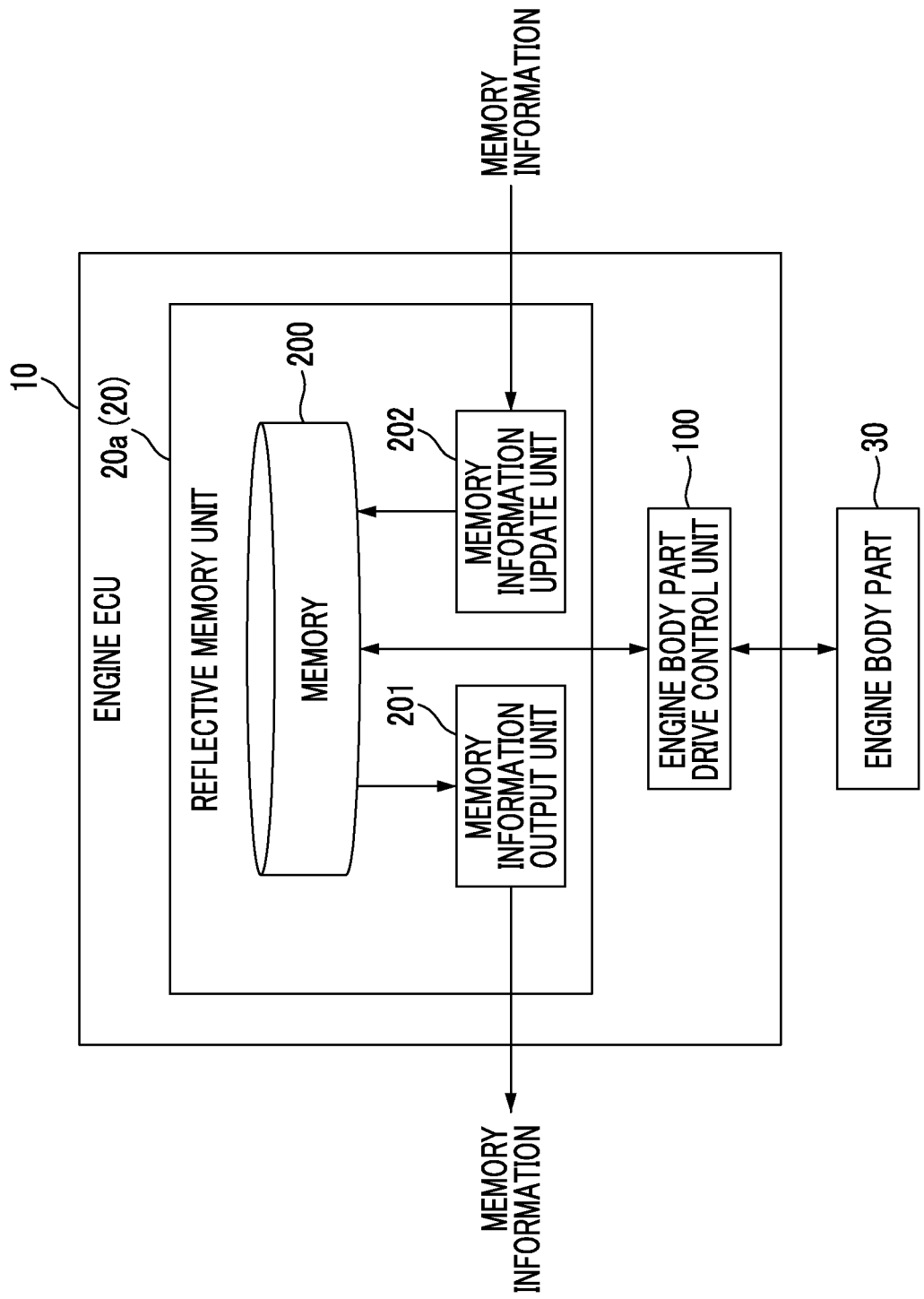
FIG. 2 is a diagram showing the functional configuration of a reflective memory unit according to the first embodiment.

FIG. 2 is a diagram showing the functional configuration of the reflective memory unit according to the first embodiment.

In regard to the reflective memory unit 20 shown in FIG. 2, while the functional configuration of the reflective memory unit 20a in the engine ECU 10 is shown as an example, the functional configurations of the reflective memory units 20b and 20c in other control devices (turbo ECU 11 and EGR-ECU 12) are the same as the functional configuration shown in FIG. 2.

As shown in FIG. 2, the reflective memory unit 20 includes the memory 200, a memory information output unit 201, and a memory information update unit 202.

The memory 200 is a storage area where memory information required for controlling the drive of each engine unit constituting the engine 3 is stored. The configuration of the storage area of the memory 200 will be described below.

The memory information output unit 201 outputs the memory information stored in the memory 200 of the reflective memory unit 20a to the reflective memory unit (the reflective memory unit 20b in the turbo ECU 11) in another control device.

The memory information update unit 202 writes the memory information received from the memory information output unit 201 of the reflective memory unit 20 (the reflective memory unit 20c in the EGR-ECU 12) in another control device into the memory 200 in the reflective memory unit 20a.

The memory information output unit 201 and the memory information update unit 202 of each reflective memory unit 20 successively executes the above-described processing, whereby the memory information stored in the memory 200 of the reflective memory unit 20 becomes identical among the respective control devices (engine ECU 10, turbo ECU 11, and EGR-ECU 12) and sharing of the memory information is achieved.

In this embodiment, the reflective memory units 20 are connected by a ring network (communication network R), and the order in which the memory information flows is always constant. That is, the memory information output unit 201 according to this embodiment outputs the memory information to one specific control device specified in advance, and the memory information update unit 202 receives the memory information from the memory information output unit 201 from one specific control device specified in advance.

For example, the memory information output unit 201 of the reflective memory unit 20a is specified in advance to output the memory information toward the memory information update unit 202 of the reflective memory unit 20b. The memory information output unit 201 of the reflective memory unit 20b is specified in advance to output the memory information toward the memory information update unit 202 of the reflective memory unit 20c. The memory information output unit 201 of the reflective memory unit 20c is specified in advance to output the memory information toward the memory information update unit 202 of the reflective memory unit 20a.

Figure 3:
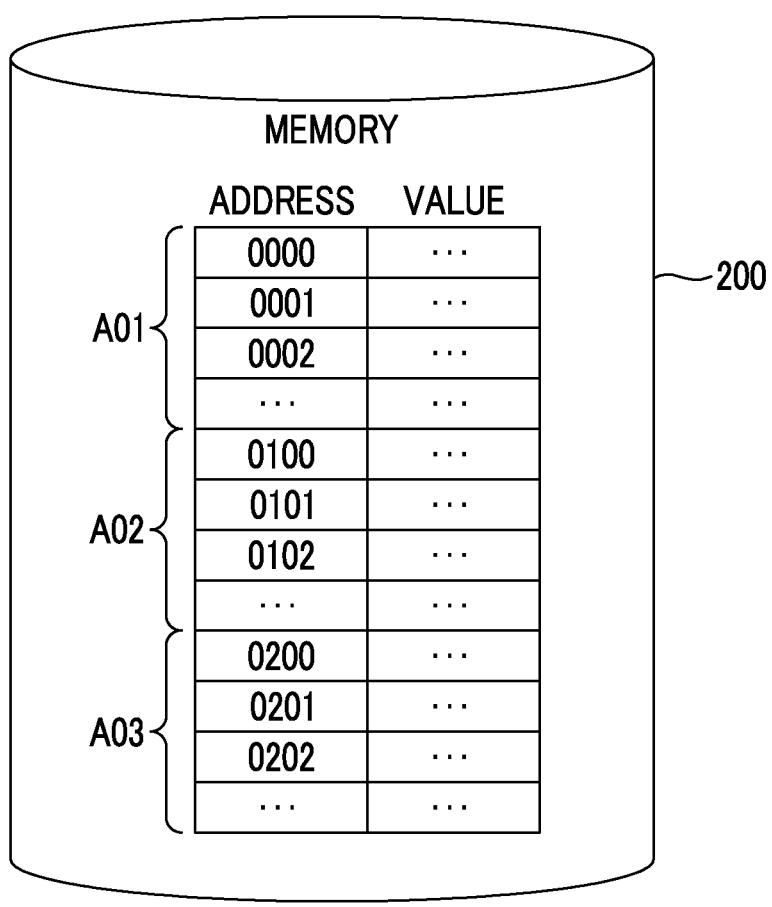
FIG. 3 is a diagram illustrating a storage area of a memory according to the first embodiment.

FIG. 3 is a diagram illustrating the storage area of the memory according to the first embodiment.

The memory 200 in each of the reflective memory units 20a, 20b, and 20c has a plurality of types of storage areas divided in advance as shown in FIG. 3. Specifically, the storage area of the memory 200 is divided into an engine body part control storage area A01, a turbo control storage area A02, and an EGR control storage area A03.

In the engine body part control storage area A01, the memory information required for controlling the drive of the engine body part 30 (FIG. 1) is stored. The engine body part drive control unit 100 (FIG. 1) performs the control of the engine body part 30 with reference to the engine body part control storage area A01 in the memory 200 mounted in the reflective memory unit 20a (FIG. 1).

In the turbo control storage area A02, the memory information required for controlling the drive of the turbocharger 31 (FIG. 1) is stored. The turbocharger drive control unit 110 (FIG. 1) performs the control of the turbocharger 31 with reference to the turbo control storage area A02 in the memory 200 mounted in the reflective memory unit 20b (FIG. 1).

Similarly, in the EGR control storage area A03, the memory information required for controlling the drive of the EGR 32 (FIG. 1) is stored. The EGR drive control unit 120 (FIG. 1) performs the control of the EGR 32 with reference to the EGR control storage area A03 in the memory 200 mounted in the reflective memory unit 20c (FIG. 1).

As described above, each of the drive control units (the engine body part drive control unit 100, the turbocharger drive control unit 110, and the EGR drive control unit 120) refers to the storage area which is divided in advance in the storage area of the memory 200 in each control device and into which information relating to the drive of the engine unit as a target to be controlled of each drive control unit is written.

Figure 4:
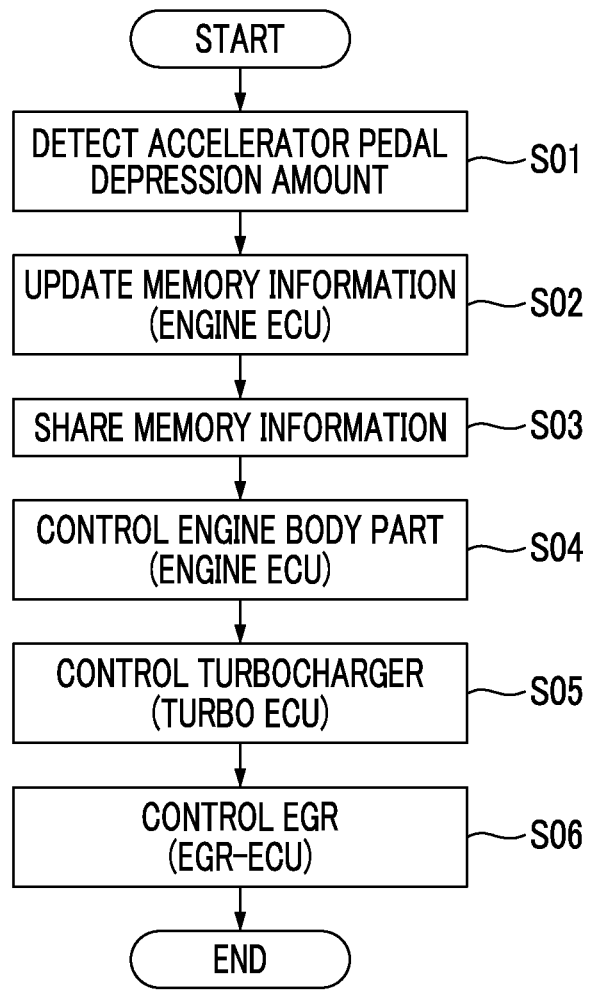
FIG. 4 is a diagram showing a processing flow of the engine control system according to the first embodiment.

FIG. 4 is a diagram showing a processing flow of the engine control system according to the first embodiment.

Hereinafter, an operation example of the engine control system 1 will be described referring to FIGS. 1, 2, 3, and 4.

For example, in a case where an accelerator pedal is depressed by a driver, or the like, the engine ECU 10 gives notification of an accelerator depression amount according to the driver's depression through an accelerator position sensor (not shown) (Step S01).

The engine ECU 10 writes a control value (for example, a fuel injection amount command value) for the engine body part 30 according to the detected accelerator depression amount into the engine body part control storage area A01 divided in the memory 200 (the memory 200 of the reflective memory unit 20a) in the engine ECU 10. Similarly, the engine ECU 10 writes a control value (for example, a supercharging pressure command value) for the turbocharger 31 according to the detected accelerator depression amount into the turbo control storage area A02 divided in the memory 200 in the engine ECU 10. In addition, the engine ECU 10 writes a control value (for example, an EGR amount command value) for the EGR 32 according to the detected accelerator depression amount into the EGR control storage area A03 divided in the memory 200 in the engine ECU 10.

In this way, the engine ECU 10 updates the memory information by writing all command values corresponding to the respective engine units according to a driver's operation into respective predetermined areas of the memory 200 in the engine ECU 10 (Step S02).

Through Step S02, if the memory information of the memory 200 mounted in the reflective memory unit 20a is updated, the memory information output unit 201 of the reflective memory unit 20a immediately outputs various kinds of updated memory information to the reflective memory unit 20b in the turbo ECU 11. The memory information update unit 202 of the reflective memory unit 20b updates the memory information by writing the received memory information into the memory 200 of the reflective memory unit 20b. In addition, the memory information output unit 201 of the reflective memory unit 20b immediately outputs various kinds of updated memory information to the reflective memory unit 20c in the EGR-ECU 12. The memory information update unit 202 of the reflective memory unit 20c updates the memory information by writing the received memory information into the memory 200 of the reflective memory unit 20c.

With this procedure, if the memory information (fuel injection amount command value, supercharging pressure command value, and EGR amount command value) of the memory 200 in the engine ECU 10 is newly updated, sharing processing of the memory information with other control devices is instantly performed (Step S03).

The engine body part drive control unit 100 controls the engine body part 30 according to the memory information stored in the engine body part control storage area A01 in the memory 200 of the reflective memory unit 20a mounted in the engine ECU 10. With this, the engine body part drive control unit 100 controls a fuel injection amount in the engine body part 30 according to the fuel injection amount command value newly written into the engine body part control storage area A01 (Step S04).

The turbocharger drive control unit 110 controls the turbocharger 31 according to the memory information stored in the turbo control storage area A02 in the memory 200 of the reflective memory unit 20b mounted in the turbo ECU 11. With this, the turbocharger drive control unit 110 controls a valve opening in the turbocharger 31 according to the supercharging pressure command value newly written into the turbo control storage area A02 (Step S05).

The EGR drive control unit 120 controls the EGR 32 according to the memory information stored in the EGR control storage area A03 in the memory 200 of the reflective memory unit 20c mounted in the EGR-ECU 12. With this, the EGR drive control unit 120 controls a valve opening in the EGR 32 according to the EGR amount command value newly written into the EGR control storage area A03 (Step S06).

The respective processing of Step S04 to Step S06 described above are actually executed simultaneously and in parallel by the respective control devices (the engine ECU 10, the turbo ECU 11, and the EGR-ECU 12).

The engine control system 1 controls the drive of the engine 3 while repeatedly executing Step S01 to Step S06 described above.

According to the engine control system 1 described above, it is possible to significantly reduce processing loads of the respective control devices (the engine ECU 10, the turbo ECU 11, and the EGR-ECU 12). For example, in a case where each control device is connected through a bus communication network based on controller area network (CAN) communication in the related art, the control device needs to execute communication processing, such as transmission and reception of information required for cooperative control, in addition to control processing of the corresponding engine unit.

In contrast, in the engine control system 1 according to this embodiment, since each control device has the reflective memory unit 20 mounted therein, the control device does not need to perform communication processing. That is, since each control device has simply to perform control with reference to only the memory information written into the memory (memory 200) therein, it is possible to reduce a load of the control device, to accelerate processing, and to increase response characteristics to an input command.

The independent communication network R among the control devices is newly provided, whereby it is possible to accelerate and stabilize communication among the control devices, and to achieve high accuracy and high reliability of cooperative control by a plurality of control devices.

In this embodiment, a plurality of reflective memory units 20 are connected through a ring network (communication network R), and the order in which the respective pieces of memory information flow is specified in one direction in advance. With this, it is possible to simplify an algorithm (that is, processing executed by the memory information output unit 201 and the memory information update unit 202) required for the memory information, and to implement a high-speed and stable communication form. Therefore, it is possible to suppress offset of control of the control device due to communication delay, and to implement higher-accuracy cooperative control.

Although the engine control system 1 according to the first embodiment has been described above in detail, a specific aspect of the engine control system 1 is not limited to that described above, and various design changes or the like may be added without departing from the spirit of the invention.

For example, in this embodiment, it has been described that the respective reflective memory units 20 are configured such that the memory information flows in an order of the engine ECU 10, the turbo ECU 11, and the EGR-ECU 12. However, in other embodiments, the invention is not limited to this aspect, and a configuration in which the memory information flow in a reverse direction (an order of the engine ECU 10, the EGR-ECU 12, and the turbo ECU 11) may be made.

The control devices constituting the engine control system 1 are not limited only to the engine ECU 10, the turbo ECU 11, and the EGR-ECU 12. That is, an engine control system 1 according to other embodiments may further include other control devices which have engine units as a target to be controlled other than the engine body part 30, the turbocharger 31, and the EGR 32. In this case, it is assumed that others control devices have reflective memory units mounted therein, and are incorporated in a ring network (communication network R).

Second Embodiment

Next, an engine control system according to a second embodiment will be described in detail referring to FIG. 5.

Figure 5:
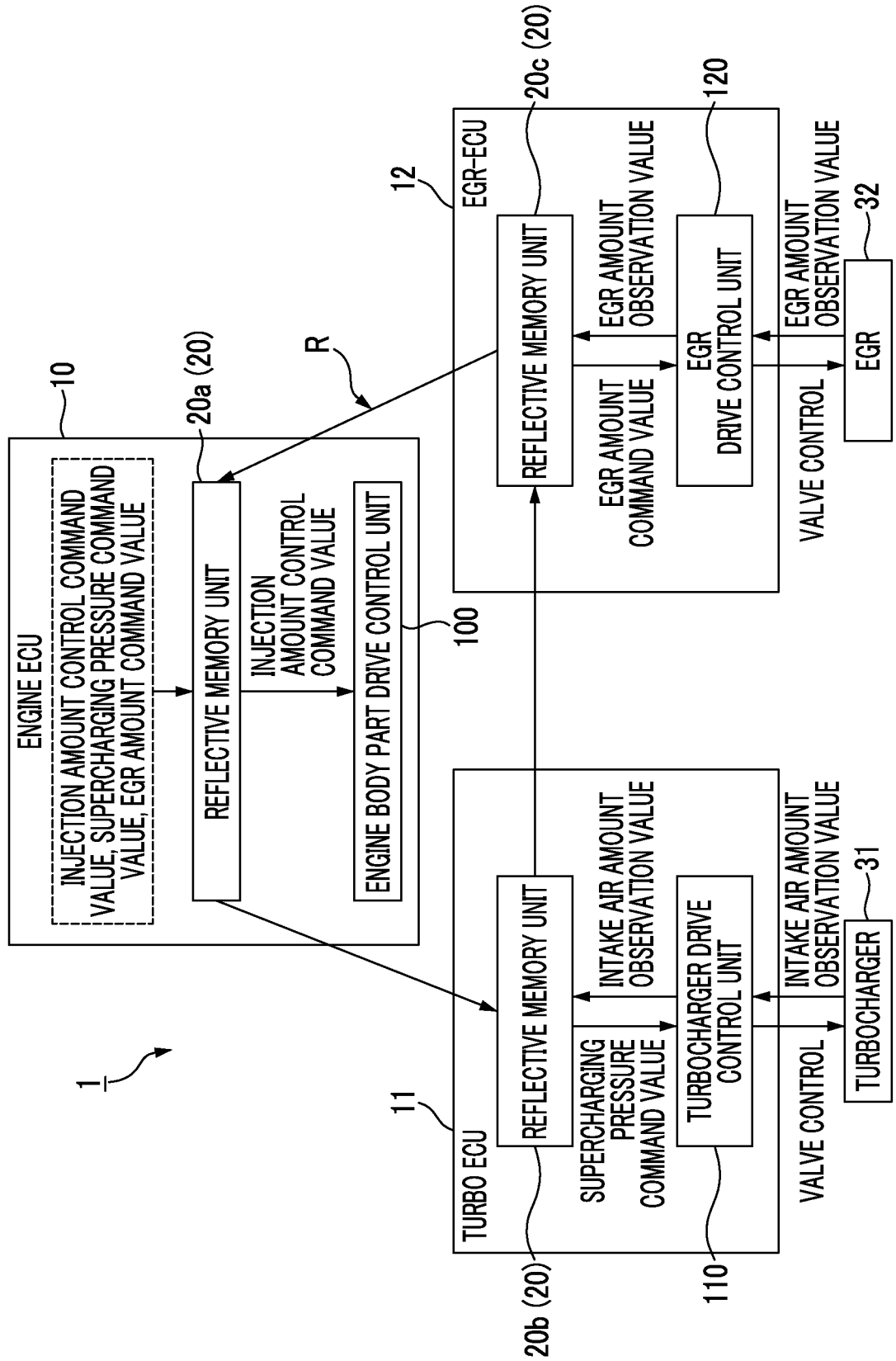
FIG. 5 is a diagram illustrating a function of an engine control system according to a second embodiment.

FIG. 5 is a diagram illustrating the function of the engine control system according to the second embodiment.

As in the first embodiment, each of the drive control units (an engine body part drive control unit 100, a turbocharger drive control unit 110, and an EGR drive control unit 120) according to this embodiment controls the drive of the engine unit as a target to be controlled of each drive control unit based on various command values stored in the reflective memory unit 20 (memory 200) in each control device.

Each of the drive control units according to this embodiment shares various observation values corresponding to the respective command values through the reflective memory unit 20. Each drive control unit controls the drive of each engine unit to be controlled with reference to a storage area, into which information relating to the drive of engine unit not as a target to be controlled of each drive control unit is written, in the storage area of the memory 200 in each control device.

Specifically, for example, as shown in FIG. 5, the turbocharger drive control unit 110 performs valve control of the turbocharger 31 based on the supercharging pressure command value written into the turbo control storage area A02 (FIG. 3) divided in the memory 200 of the reflective memory unit 20b. The turbocharger drive control unit 110 writes an intake air amount observation value measured in the turbocharger 31 into the turbo control storage area A02 divided in the memory 200 of the reflective memory unit 20b.

Similarly, as shown in FIG. 5, the EGR drive control unit 120 performs valve control of the EGR 32 based on the EGR amount command value written into the EGR control storage area A03 (FIG. 3) of the memory 200 of the reflective memory unit 20c. The EGR drive control unit 120 writes an EGR amount observation value measured in the EGR 32 into the EGR control storage area A03 divided in the memory 200 of the reflective memory unit 20c.

If the intake amount observation value is written by the turbocharger drive control unit 110 or the EGR amount observation value is written the EGR drive control unit 120 as described above, each reflective memory unit 20 instantly executes the sharing processing (see Step S03 shown in FIG. 4) of the memory information. With this, in the memory 200 mounted in each of the reflective memory units 20a, 20b, and 20c, not only various command values written by the engine ECU 10 but also various observation values (intake air value observation value and EGR amount observation value) observation in the respective engine units are shared.

The turbocharger drive control unit 110 according to this embodiment performs control based on the EGR amount observation value measured by the EGR 32 with reference to not only the intake air amount command value written into the turbo control storage area A02 but also the EGR control storage area A03 into which information relating to the drive of the EGR 32 not as a target to be controlled is written.

In this way, the turbocharger drive control unit 110 can execute valve control based on the supercharging pressure command value stored in the turbo control storage area A02 and the EGR amount observation value stored in the EGR control storage area A03 such that a mechanical load is suppressed or an optimum intake air amount for maximizing energy efficiency is obtained.

Similarly, the EGR drive control unit 120 according to this embodiment performs control based on the intake air amount observation amount measured by the turbocharger 31 with reference to not only the EGR amount command value written into the EGR control storage area A03 and the turbo control storage area A02 into which information relating to the drive of the turbocharger 31 not as a target to be controlled is written.

In this way, the EGR drive control unit 120 can execute valve control based on the EGR amount command value stored in the EGR control storage area A03 and the intake air amount observation value stored in the turbo control storage area A02 such that an optimum EGR amount is obtained.

As described above, according to the engine control system 1 of the second embodiment, it is possible to execute optimum control as the whole of the engine 3 with reference to not only information relating to an engine unit as a target to be controlled but also information relating to the an engine unit not as a target to be controlled.

In the above-described example, although the turbocharger drive control unit 110 executes the valve control based on the supercharging pressure command value stored in the turbo control storage area A02 and the EGR amount observation value stored in the EGR control storage area A03, in other embodiments, the invention is not limited to this aspect. For example, the turbocharger drive control unit 110 may perform the valve control based on a deviation between the EGR amount command value and the EGR amount observation value while referring to the EGR amount command value stored in the EGR control storage area A03. The same applies to the EGR drive control unit 120 described above.

Third Embodiment

Next, a vehicle system according to a third embodiment will be described in detail referring to FIG. 6.

Figure 6:
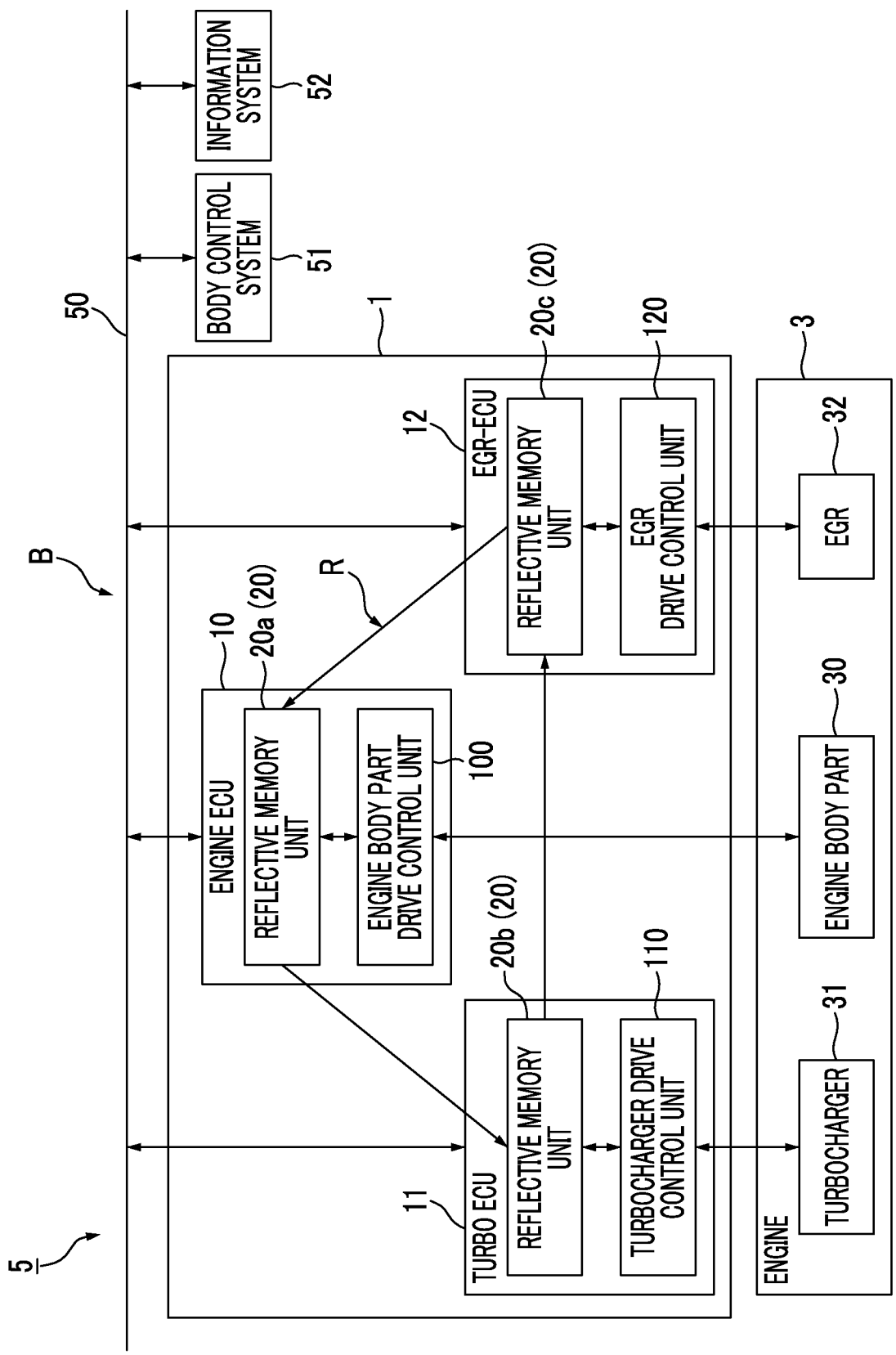
FIG. 6 is a diagram showing the functional configuration of a vehicle system according to a third embodiment.

FIG. 6 is a diagram showing the functional configuration of the vehicle system according to the third embodiment.

As shown in FIG. 6, a vehicle system 5 includes the engine control system 1 according to the first embodiment (or the second embodiment), a bus 50, a body control system 51, and an information system 52.

As described above, the engine control system 1 has a plurality of control devices (the engine ECU 10, the turbo ECU 11, and the EGR-ECU 12) which respectively control the respective engine units constituting the engine 3.

The body control system 51 is one in-vehicle system mounted in a vehicle, and is an in-vehicle system which controls windows, doors, or the like of the vehicle.

Similarly, the information system 52 is one in-vehicle system mounted in the vehicle, and is an in-vehicle system which controls a car navigation device, audio instrument, or the like.

The bus 50 constitutes a communication network B which allows communication among a plurality of control devices (the engine ECU 10, the turbo ECU 11, and the EGR-ECU 12) constituting the engine control system 1, the body control system 51, and the information system 52. That is, the vehicle system 5 according to this embodiment is constituted of the communication network B which is a bus network. In general, communication between the respective systems by way of the communication network B is performed, for example, using CAN communication.

As described above, the vehicle system 5 according to this embodiment is constructed by combining two different independent communication networks including the ring network (communication network R) which connect the respective reflective memory units 20 in the engine control system 1 and the bus network which allows CAN communication with other in-vehicle systems (body control system 51, the information system 52, and the like).

In this way, in an engine control system which requires high-speed processing, with the use of an optical fiber, it is possible to perform communication at higher speed than the communication wiring of the related art. In addition, in a case where an optical fiber is used, it is possible to provide resistance against noise expected to be caused by communication or vibration in the engine, and to increase the reliability of the engine control system.

The bus network (communication network B) of the related art is applied in the communication network in which high-speed communication is not required, and a ring network (communication network R) is applied in the engine control system 1 in which high speed and high reliability are required. Therefore, it is possible to implement this configuration only by adding a minimum required network (communication network R) to an existing network configuration, and to minimize labor or costs concerning network design.

Although several embodiments of the invention have been described above, these embodiments are only examples and are not intended to limit the scope of the invention. These embodiments may be carried out in other various forms, and may include various omissions, replacements, or modifications without departing from the spirit of the invention. These embodiments and modifications are included in the scope or spirit of the invention, and similarly, are included in the inventions described in the appended claims and equivalents thereof.

INDUSTRIAL APPLICABILITY

According to the respective embodiments described above, it is possible to reduce a calculation load of each ECU while suppressing communication delay between the ECUs.

REFERENCE SIGNS LIST

1: engine control system
10: engine ECU (control device)
100: engine body part drive control unit (drive control unit)
11: turbo ECU (control device)
110: turbocharger drive control unit (drive control unit)
12: EGR-ECU (control device)
120: EGR drive control unit (drive control unit)
20, 20a, 20b, 20c: reflective memory unit
200: memory
201: memory information output unit
202: memory information update unit
3: engine
30: engine body part (engine unit)
31: turbocharger (engine unit)
32: EGR (engine unit)
5: vehicle system
50: bus
51: body control system (in-vehicle system)
52: information system (in-vehicle system)
A01: engine body part control storage area
A02: turbo control storage area
A03: EGR control storage area
B: communication network (bus network)
R: communication network (ring network)

The invention claimed is:

1. An engine control system comprising:
a plurality of control devices which respectively control a plurality of engine units constituting an engine,
each of the plurality of control devices being connected to one of the plurality of engine units, each control device including,
a driver connected to an engine unit among the plurality of engine units, and
a memory that stores memory information that causes the driver to control an engine unit, the memory, wherein each control device is programmed to
output memory information stored in the memory to a memory of another control device among the plurality of control devices, and
receive memory information from a memory of another control device among the plurality of control devices, and store the received information in the memory, such that the memory information stored in the memory as well as the memory information stored in all other control devices are completely identical
wherein the engine unit is controlled by the driver according to the memory information stored in the memory of any one of the plurality of control devices.

2. The engine control system according to claim 1,
wherein the memory outputs the memory information to one specific control device specified in advance, and
the memory receives the memory information from the memory information output unit of the one specific control device specified in advance.

3. The engine control system according to claim 1,
wherein the driver refers to a storage area which is a storage area divided in advance in a storage area of the memory and into which memory information relating to the drive of the engine unit to be controlled is written.

4. The engine control system according to claim 3,
wherein the driver further refers to a storage area which is a storage area divided in advance in the storage area of the memory and into which memory information relating to the drive of the engine unit not to be controlled is written.

5. A vehicle system comprising:
the engine control system according to claim 1; and
an in-vehicle system which is mounted in a vehicle,
wherein the engine control system and the in-vehicle system are connected through a communication network independent from a communication network which connects the memory of the plurality of control devices.

6. An engine control method which controls an engine using a plurality of control devices configured to respectively control a plurality of engine units constituting the engine, the engine control method comprising:

a step of controlling the drive of the engine unit to be controlled according to memory information stored in a memory of each of the plurality of control devices;
a step of outputting memory information stored in the memory of the control device to a memory of other control devices; and
a step of receiving memory information from another memory of another control device, such that the memory information stored in the memory is the same as the memory information stored in the memory of the other control devices; and
controlling an engine unit according to the memory information stored in the memory of any one of the plurality of control devices.

7. The engine control system according to claim 2,
wherein the driver refers to a storage area which is a storage area divided in advance in a storage area of the memory and into which information relating to the drive of the engine unit to be controlled is written.

8. A vehicle system comprising:
the engine control system according to claim 2; and
an in-vehicle system which is mounted in a vehicle,
wherein the engine control system and the in-vehicle system are connected through a communication network independent from a communication network which connects the memory of the plurality of control devices.

9. A vehicle system comprising:
the engine control system according to claim 3; and
an in-vehicle system which is mounted in a vehicle,
wherein the engine control system and the in-vehicle system are connected through a communication network independent from a communication network which connects memory of the plurality of control devices.

10. A vehicle system comprising:
the engine control system according to claim 4; and
an in-vehicle system which is mounted in a vehicle,
wherein the engine control system and the in-vehicle system are connected through a communication network independent from a communication network which connects the memory of the plurality of control devices.

* * * * *